United States Patent
DeWachter

(12) 
(10) Patent No.: US 6,425,690 B1
(45) Date of Patent: Jul. 30, 2002

(54) POSITIVE LOCK FOR BEARING SUBASSEMBLY AND ADJUSTING NUT KIT

(75) Inventor: Ryan N. DeWachter, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/670,144

(22) Filed: Sep. 26, 2000

(51) Int. Cl.[7] ............................................... F16C 25/06
(52) U.S. Cl. ..................... 384/583; 384/540; 384/538; 384/585
(58) Field of Search ................................. 384/519, 540, 384/585, 537, 538, 583

(56) References Cited

U.S. PATENT DOCUMENTS 5,011,306 A    4/1991  Martinie
5,489,156 A  *  2/1996  Martinie ..................... 384/538
5,685,650 A  * 11/1997  Martinie et al. ............. 384/538
5,709,483 A  *  1/1998  Martinie ..................... 384/538

* cited by examiner

Primary Examiner—Lenard A. Footland
(74) Attorney, Agent, or Firm—Bernard S. Klosowski, Jr.; Alexander M. Gerasimow; William R. Walbrun

(57) ABSTRACT

A bearing subassembly includes an improved arrangement for securing the bearing subassembly to a shaft. An adjusting nut is axially locked to a bearing inner ring by sliding the adjusting nut over the inner ring so that a groove in the adjusting nut and recesses, for example, pockets, on the inner ring align. Securement elements, for example, balls, are inserted into the groove and seated in the recesses through a bore from the outer diameter of the adjusting nut to the groove. The inner ring is rotated to allow the securement elements to fall into the recesses and are enclosed between the groove and recesses by inserting, for example, a set screw after the securement elements are loaded. The securement arrangement then prevents the bearing subassembly adjusting nut and inner ring from separating.

16 Claims, 5 Drawing Sheets

POSITIVE LOCK FOR BEARING SUBASSEMBLY AND ADJUSTING NUT KIT

BACKGROUND OF THE INVENTION

The present invention relates generally to a shaft mounting assembly. More particularly, the invention relates to a multi-piece bearing subassembly securable as a single unit to a shaft within a shaft mounting assembly.

Shaft mounting assemblies are often designed to be quickly attached to a shaft. Typically, a bearing subassembly is first slipped along the shaft to the desired position. Once there, the inner ring of the bearing subassembly is secured to the shaft utilizing one of various clamping techniques, such as use of a tapered adapter having a tapered outer surface and an axial bore for receipt of the shaft. The tapered adapter is forced axially into a tapered opening in the inner ring by manipulation of an adjusting nut. The tapered adapter is closed around the shaft by mating threads on one end of the adapter and corresponding threads on the adjusting nut. Further sliding of the bearing inner ring along the tapered outer surface achieves a press fit between the tapered surfaces.

Generally, bearing subassemblies utilizing tapered adapters have been commercially available in two types, a pull type and a push type. One pull-type adapter is illustrated in U.S. Pat. No. 5,011,306 issued Apr. 30, 1991 to Martinie. In the pull type, threads are defined on the tapered adapter adjacent its lesser diameter end, and an adjusting lock nut is tightened onto the threads to pull the tapered adapter into the shaft bore of the bearing subassembly. A number of push-type adapter designs are shown in U.S. Pat. No. 5,685,650 issued Nov. 11, 1997 to Martinie et al. In a push-type adapter, threads are disposed on the greater diameter end of the adapter, and the adapter is pushed into the bearing inner ring by rotation of the adjusting nut relative to the adapter. In one of the push-type designs, a radially-compressible snap ring provides an annular interconnection between the adjusting nut and bearing inner ring. The snap ring is placed in a groove on an outer surface of the bearing inner ring and the nut is axially moved onto the bearing inner ring such that the nut leading surface compresses the snap ring into the groove. When an opposed groove in an inner surface of the nut is aligned with the groove in the bearing inner ring, the snap ring expands into the nut groove to connect the nut and inner ring member.

A limitation of this design is the occasional inability to ascertain whether the snap ring is seated properly due to burrs or other anomalies on the snap ring. Further, even if a snap ring is seated properly, large load forces could, on rare occasions, cause a defective snap ring to break or prematurely unseat. Improperly seated, broken, or unseated rings could lead to separation of the bearing assembly, potentially resulting in equipment damage and costs associated with servicing affected equipment.

OBJECTIVE AND SUMMARY OF THE INVENTION

It is accordingly an objective of the present invention to provide a bearing subassembly having a positive locking arrangement between the inner ring and adjusting nut.

It is another objective of the present invention to provide an improved shaft mounting assembly for securing a bearing to an elongated shaft.

It is yet another objective of the invention to provide a simple, economical, and reliable locking arrangement and clamping assembly.

Some of these objects are achieved by a bearing subassembly according to the present invention. The bearing subassembly includes a bearing inner ring with an axial opening. The bearing inner ring has an outer surface which includes a circumferential portion having at least one recess. An adapter extends around the shaft and within the axial opening of the bearing inner ring. An annular adjusting nut is configured to receive the bearing inner ring and to be secured to the adapter. The adjusting nut defines an internal surface and an inner groove disposed circumferentially about the adjusting nut internal surface. The adjusting nut further defines an external surface and a bore extending between the adjusting nut external surface and the adjusting nut inner groove. Securement members are insertable through the bore and disposed between the adjusting nut inner groove and the bearing inner ring recess to axially secure the bearing inner ring member to the adjusting nut. In this construction, the inner ring recesses may be bowl shaped pockets.

In another exemplary construction, an adjusting nut kit for securing a rotatable shaft to a bearing inner ring having a plurality of recesses on its outer surface to a shaft mounting assembly includes an annular adjusting nut having an internal surface defining an inner circumferential groove. The adjusting nut further defines a bore in communication with the groove. The groove in the adjusting nut opposes the recesses in the bearing inner ring member when the adjusting nut is secured to the adapter. Balls are insertable through the bore into the recesses and the groove to axially secure the adjusting nut to the bearing inner ring member. A set screw, for example, can be used to close the radial bore.

Another aspect of the invention includes a method of securing a bearing subassembly to a shaft. The method comprises sliding an inner ring with recesses disposed circumferentially on one end of the ring onto the shaft. Next, a tapered adapter is slid onto the shaft proximate the inner ring. An adjusting nut with a circumferential groove disposed internally about one end is then slid onto the shaft via the nut's bore. The adjusting nut is mated to one end of the inner ring. The other end of the adjusting nut is mated to one end of the adapter. The adjusting nut is rotated until the bore aligns with one of the recesses so that they oppose the opposite groove. A ball bearing is inserted through the bore into the recess. The adjusting nut is rotated repeatedly and balls are inserted until the recesses are filled. The bore is closed and the adjusting nut is rotated to axially press fit the adapter to the shaft.

Other objectives, features, and aspects of the present invention are discussed in greater detail below or may be learned through practice of the invention.

BRIEF DESCRIPTION OF THE DRAWINGS

A full and enabling disclosure of the present invention, including the best mode of carrying out the invention, to one of ordinary skill in the pertinent art is set forth more particularly in the remainder of the specification including reference to the accompanying drawings in which.

Figure 1:
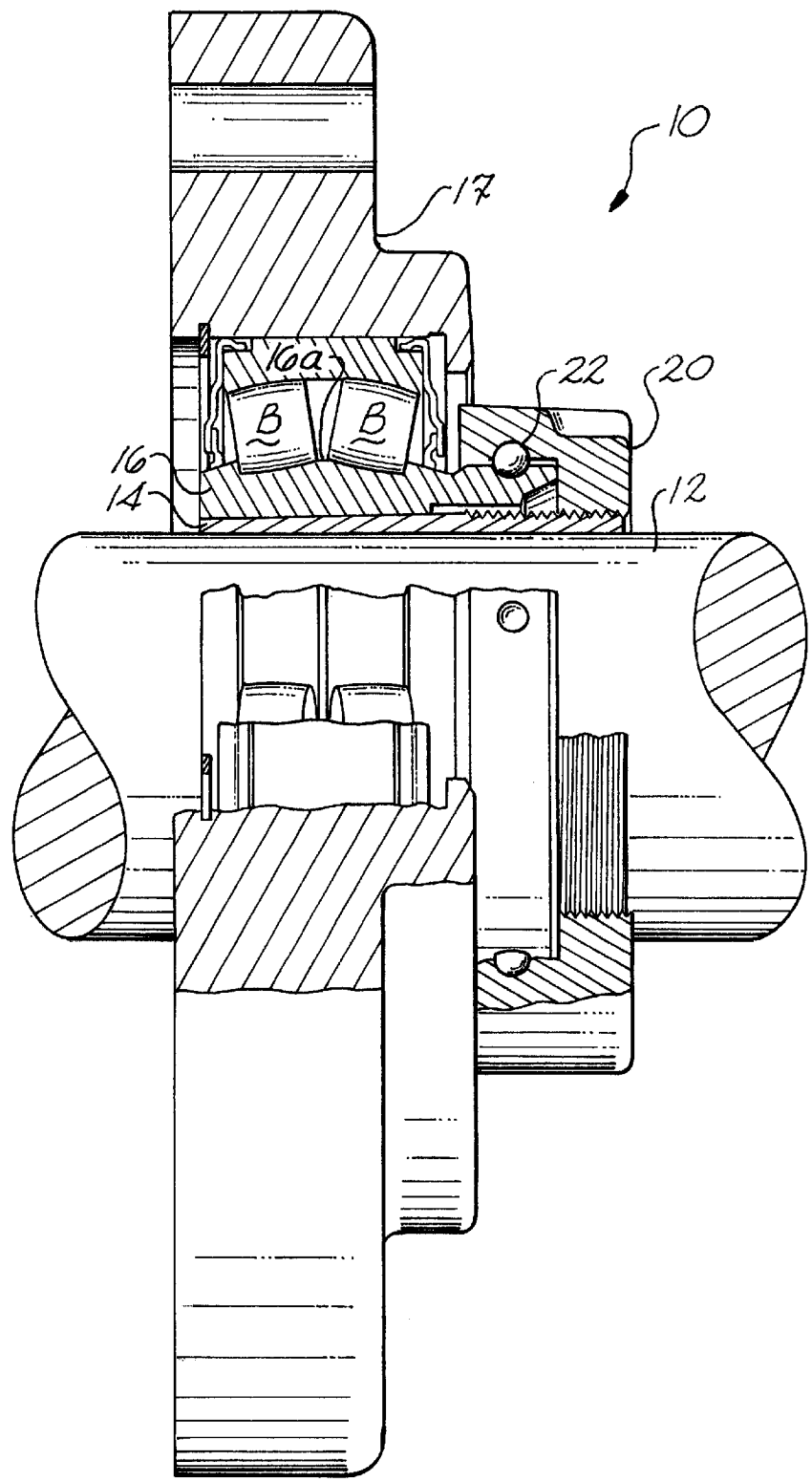
FIG. 1 is a partial, cross-sectional view of an exemplary embodiment of a shaft mounting assembly and bearing subassembly disposed around a shaft and constructed in accordance with the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the pertinent art that the following description of exemplary embodiments is not intended as limiting the broader aspects of the present invention, which is defined by the scope of the appended claims and their equivalents.

Referring now to FIG. 1, a shaft mounting assembly 10 constructed in accordance with a preferred embodiment of the present invention is shown secured to a shaft 12. FIG. 1 also reveals a tapered adapter 14 through which shaft 12 extends and a bearing inner ring member 16 is received about tapered adapter 14. Ring member 16 includes at least one raceway 16a for receiving a plurality of bearings B. As described herein, shaft mounting assembly 10 includes bearing inner ring member 16 of bearing assembly 17. It should be understood that bearing assembly 17 could be any type of assembly suitable for supporting a rotatable shaft. Thus, further details of bearing assembly 17 need not be given to enable one skilled in the art to appreciate and practice the claimed invention.

Figure 2:
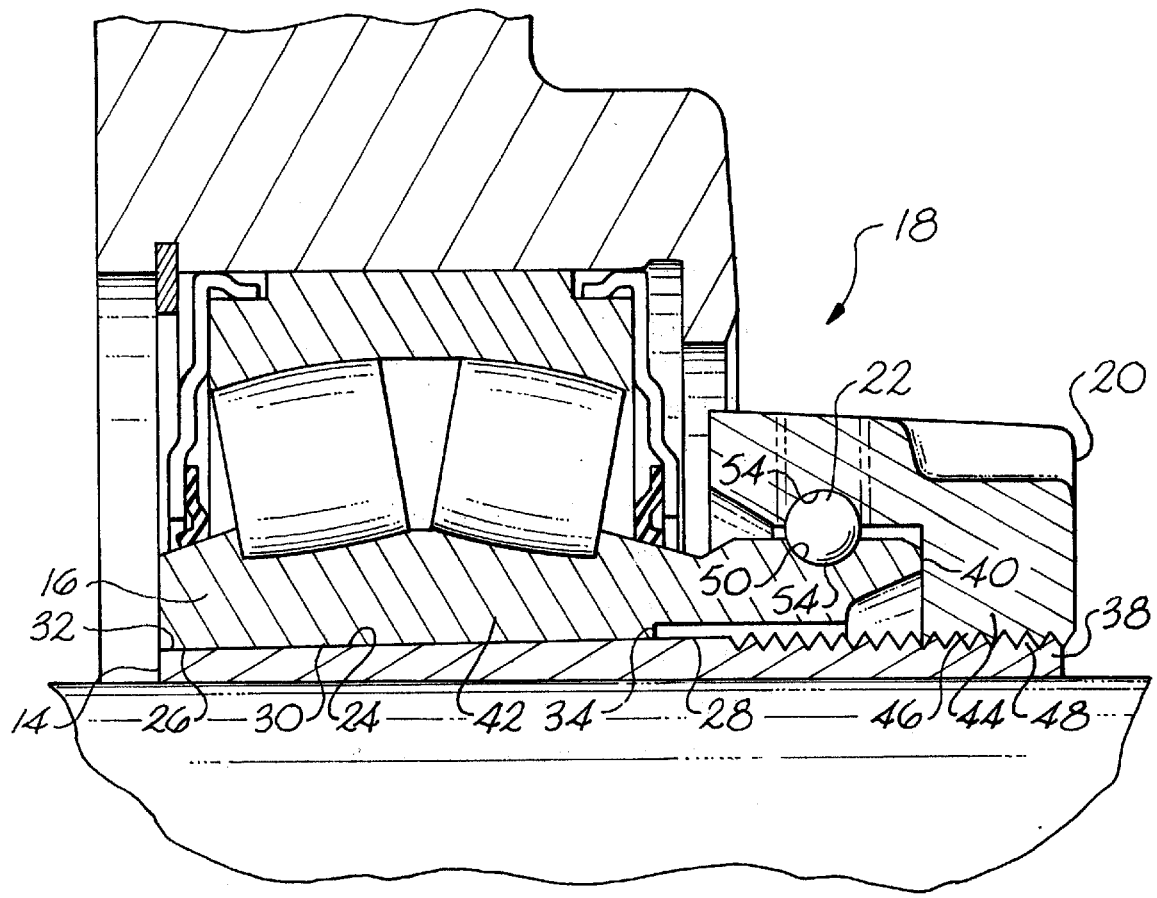
FIG. 2 is an enlarged, partial, cross-sectional view of a portion of the device of FIG. 1.

FIG. 2 particularly shows a bearing subassembly 18 cross-section enlarged from FIG. 1. The bearing subassembly 18 includes the tapered adapter 14, the inner ring 16, an adjusting nut 20, and a securement element 22. Although bearing inner ring member 16 is typically commercially supplied as part of bearing assembly 17, it should be understood that the bearing subassembly 18 described below includes such bearing inner ring 16.

Tapered adapter 14 further defines a tapered outer surface 24 extending between a first end 26 of lesser diameter and a second end 28 of greater diameter. As shown in FIG. 2, inner ring member 16 defines a tapered inner surface 30 generally complementary to tapered outer surface 24 and having larger and smaller diameter ends 34 and 32. Adapter 14 further defines a radial slot 36 extending along its entire axial length as can be most easily seen in FIG. 3. Radial slot 36 allows the adapter 14 to contract around the shaft 12 as tapered outer surface 24 and tapered inner surface 30 are moved axially together. As a result, positive clamping of bearing subassembly 18 to shaft 12 is achieved. Tapered adapter 14 further includes an extension portion 38 axially extending from the larger diameter end 28 of tapered outer surface 24. Similarly, inner ring 16 includes an extension portion 40 axially extending from a larger diameter end 42 of tapered inner surface 30.

The nut 20 includes a first axial portion 44 defining inner threads 46 for engaging outer threads 48 defined about the extension portion 38. As will be described more fully below, nut 20 is connected to inner ring 16 via extension portion 38 such that axial movement of nut 20 will cause corresponding axial movement of inner ring 16. However, threads 46 and 48 connect nut 20 to extension portion 38 so as to also allow free rotation of nut 20 about extension portion 38 and correspondingly slight relative axial movement. Thus, once nut 20 is secured to bearing inner ring 16, rotation in one direction of nut 20 will push adapter 14 into bearing inner ring 16 to cause tapered outer surface 24 and tapered inner surface 30 to be moved into engagement. Rotation of nut 20 in the opposite direction will pull adapter 14 out of bearing inner ring 16 to cause tapered outer surface 24 and tapered inner surface 30 to be moved out of engagement.

Figure 3:
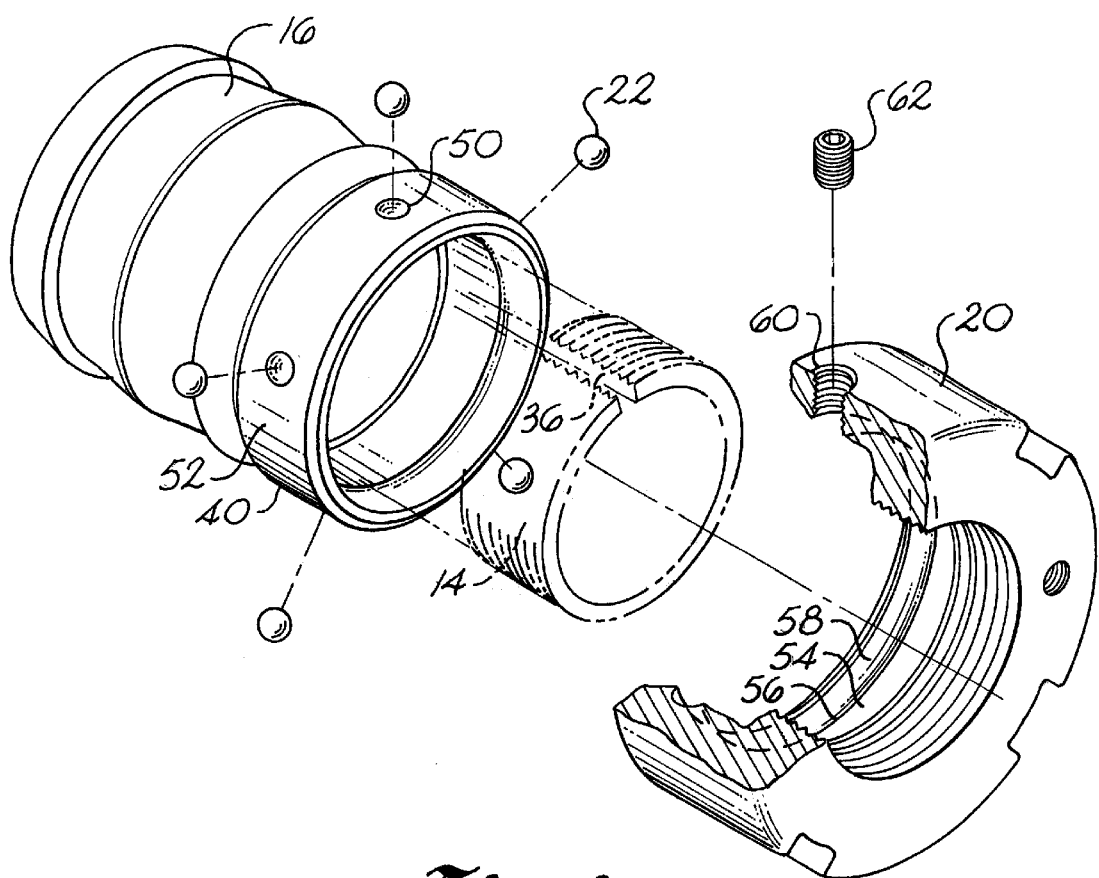
FIG. 3 is an exploded view of the bearing subassembly as removed from the shaft.

Referring now particularly to FIG. 3, a preferred manner by which nut 20 may be suitably connected to inner ring 16 is illustrated. As shown, a plurality of pockets 50 are defined about the outer surface 52 of the inner ring extension portion 40. A circumferential groove 54 is defined about an inner surface 56 of a second axial portion 58 of nut 20. The groove 54 preferably has a substantially semicircular cross-section and pockets 50 preferably are substantially hemispherical (i.e., bowl shaped). In use, pockets 50 and groove 54 are radially opposed.

In accordance with the invention, securement members 22 are provided to axially secure together inner ring member 16 and nut 20. As illustrated, such securement members 22 preferably comprise a plurality of substantially spherical members such as balls. As shown best in FIG. 2, pockets 50 and groove 54 are of sufficient radius and depth to permit members 22 to be received entirely therein. Members 22 are disposed substantially equally between pockets 50 and groove 54 to cause nut 20 to be axially locked to inner ring 16.

Referring again to FIG. 3, nut 20 further defines an opening 60 in communication with groove 54 through which members 22 may be inserted. As shown, the opening 60 preferably extends radially, but the opening 60 could extend axially or in some other direction or combination of directions if desired. Also, opening 60 is preferably threaded for receiving a set screw 62, although other devices that snap, slide, or plug in could be utilized instead.

Removal of the set screw 62 permits members 22 to be placed through opening 60 into the groove 54. If opening 60 is not aligned with a pocket 50 when a member 22 is inserted, rotating nut 20 relative to inner ring 16 will bring a pocket 50 into alignment with the opening 60 allowing the member 22 to enter the pocket 50. Further relative rotation causes the pocket 50, into which the member 22 has entered, to carry the member 22 along with it. Upon further relative rotation, an adjacent pocket 50 will align with the opening 60 allowing another member 22 to enter the adjacent pocket 50. This process is continued until all pockets 50 contain members 22 at which point the inner ring 16 is axially but not rotatably locked to nut 20. Set screw 62 may be replaced to prevent members 22 from falling out of groove 54 and pockets 50. Opposite rotation of nut 20 and inner ring 16 drives tapered adapter 14 axially into the inner ring 16 due to interaction of threads 46 and 48. Such axial movement eventually rotationally locks inner ring 16 and tapered adapter 14 due to frictional engagement of tapered surfaces 24 and 30.

As described herein, nut 20 and securement members 22 may be considered to comprise an adjusting nut kit that could be separately sold for use with various bearing assemblies, such as assembly 17. The kit could also include tapered adapter 14, if desired, as well as set screw 62.

Figure 4A:
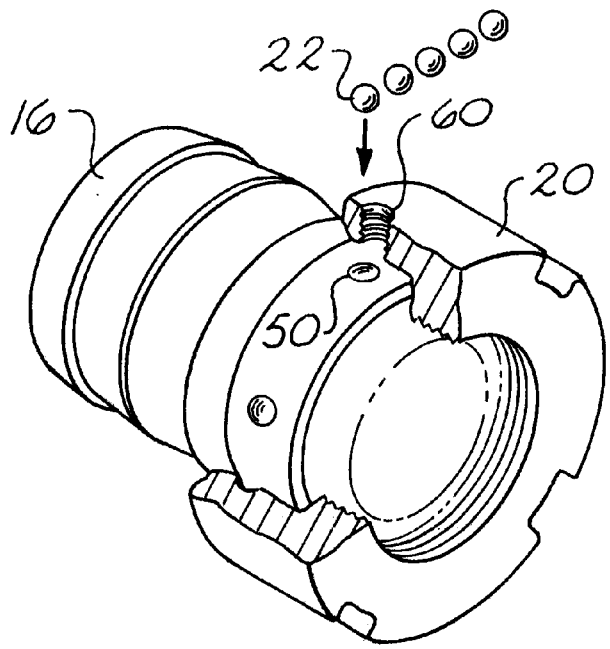
FIG. 4A is a partial sectional view showing a method of inserting securement elements into a bearing inner ring of the bearing subassembly.
Figure 4B:
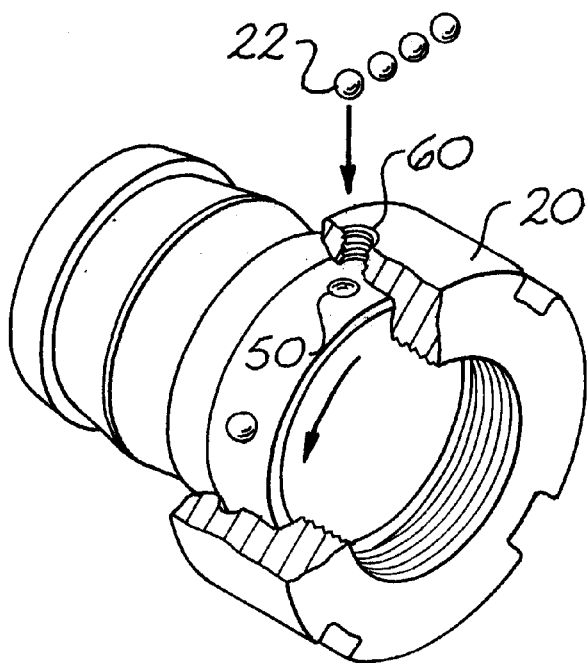
FIG. 4B is a further view of the method as shown in FIG. 4A showing one securement element inserted and the bearing inner ring positioned for receiving a second securement element.

FIGS. 4A and 4B illustrate a method of positively locking bearing subassembly 18. As shown, members 22 are inserted sequentially into pockets 50. FIG. 4A illustrates inserting a first member 22 into a first pocket 50 and FIG. 4B illustrates further methodically relatively rotating adjusting nut 20 to align the opening 60 with an adjacent pocket 50 for receipt of a second member 22. To disassemble bearing subassembly 18, the opposite steps are taken.

Figure 5A:
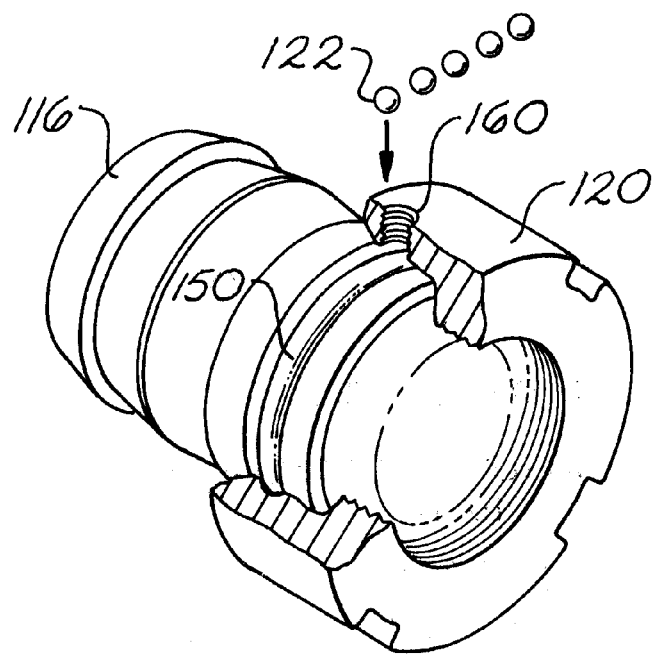
FIG. 5A is a partial sectional view showing an alternative bearing inner ring design having a groove to hold the securement elements in contrast to the singular recesses shown in FIG. 4A.
Figure 5B:
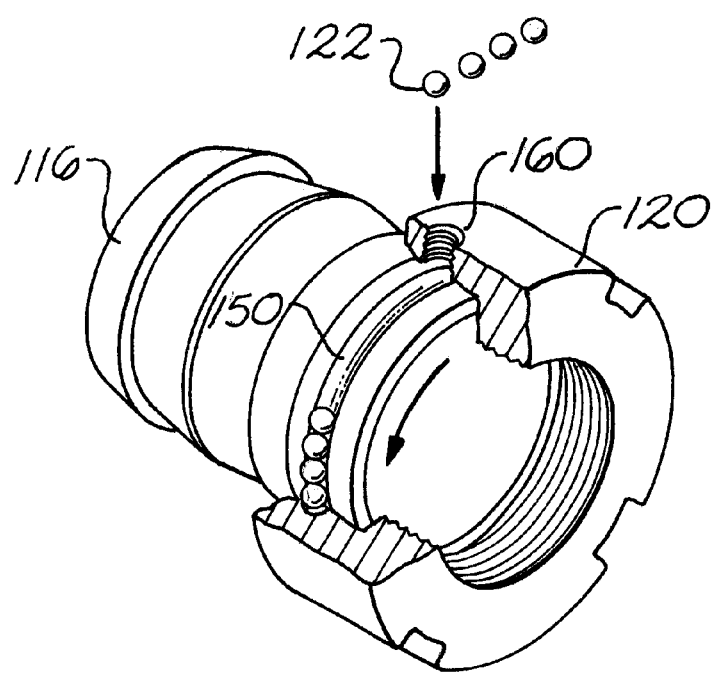
FIG. 5B is a partial sectional view as in FIG. 5A showing a number of securement elements in place within the groove.

FIG. 5A illustrates an alternative inner ring 116. In this case, pockets 50 are replaced by an external groove 150 for receipt of securement members 122. External groove 150 extends circumferentially around inner ring 116 and is substantially semicircular in cross-section. A greater number of members 122 are preferably provided so as to substantially fill inner ring groove 150. The method of inserting members 122 is essentially the same as above. FIG. 5B illustrates methodically rotating adjusting nut 120 to align the set screw opening 160 above an opening of groove 150 for sequential receipt of a plurality of members 122.

While preferred embodiments of the invention have been shown and described, modifications and variations may be practiced by those of ordinary skill in the art without departing from the spirit and scope of the present invention which is more particularly set forth in the appended claims. For example, the securement members need not be spherical (balls). Other types of securement members, such as cylindrical rollers, could also be employed. Also, the location and path of the opening for inserting the securement members could be altered from that shown in several ways by reconfiguring the adjusting nut or bearing inner ring. In addition, it should be understood that aspects of the various embodiments may be interchanged both in whole or in part. Those of ordinary skill in the art will appreciate that the foregoing descriptions are by way of example only and are not intended to limit the invention so further described in the appended claims.

I claim:

1. A bearing subassembly for rotatably supporting a shaft within a shaft mounting assembly, the bearing subassembly comprising:
   a bearing inner ring member defining an axial opening, the bearing inner ring member having an outer surface including a circumferential portion defining at least one recess therein;
   an adapter extending around the shaft and disposed within the axial opening;
   an annular adjusting nut configured to slidably and concentrically receive the bearing inner ring member and to be secured to the adapter, the adjusting nut defining an internal surface and an inner groove disposed circumferentially about the adjusting nut internal surface, the adjusting nut further defining an external surface and a bore extending between the adjusting nut external surface and the adjusting nut inner groove; and
   at least one securement member insertable through the bore and disposed between the adjusting nut inner groove and the bearing inner ring member at least one recess to thereby axially secure the bearing inner ring member to the adjusting nut.

2. The bearing subassembly as in claim 1, wherein the bearing inner ring member defines an outer circumferential raceway in communication with the shaft mounting assembly.

3. The bearing subassembly as in claim 1, wherein the at least one securement member is a ball.

4. The bearing subassembly as in claim 3, wherein the at least one recess is generally bowl-shaped.

5. The bearing subassembly as in claim 1, wherein the at least one recess is a groove disposed circumferentially about the bearing inner ring member outer surface.

6. The bearing subassembly as in claim 5, wherein the at least one securement member is a ball.

7. The bearing subassembly as in claim 1, further comprising a set screw removably disposed within the bore.

8. An adjusting nut kit for securing a rotatable shaft to a bearing inner ring member of a shaft mounting assembly via an adapter disposed about the shaft, the bearing inner ring member having an outer surface including a circumferential portion defining at least one recess therein, the adjusting nut kit comprising:
   an annular adjusting nut having an internal surface defining an inner circumferential groove, the adjusting nut also defining a bore in communication with the groove, the groove in the adjusting nut opposing the at least one recess in the bearing inner ring member when the adjusting nut is secured to the adapter; and
   at least one ball insertable through the bore into the at least one recess and the groove to axially secure the adjusting nut to the bearing inner ring member.

9. The adjusting nut kit as in claim 8, further including a set screw removably insertable into the bore.

10. The adjusting nut kit as in claim 8, wherein the kit includes the adapter, and wherein the adjusting nut and the adapter are securable together via mating threads.

11. The adjusting nut kit as in claim 8, wherein the at least one recess is generally bowl-shaped.

12. The adjusting nut kit as in claim 8, wherein the at least one recess is a groove disposed circumferentially about the bearing inner ring member outer surface.

13. A bearing subassembly for rotatably supporting a shaft within a shaft mounting assembly, the bearing subassembly comprising:
   a bearing inner ring member having an outer surface including a circumferential portion defining at least one recess therein;
   an annular adjusting nut configured for securement to the bearing inner ring member, the adjusting nut defining an internal surface and an inner groove disposed circumferentially about the adjusting nut internal surface, the adjusting nut further defining an external surface and a bore extending between the adjusting nut external surface and the adjusting nut inner groove; and
   at least one securement member insertable through the bore and disposed between the adjusting nut inner groove and the at least one recess to thereby axially secure the bearing inner ring member to the adjusting nut.

14. The bearing subassembly as in claim 13, further comprising means for removably sealing the bore to hold the at least one securement member between the adjusting nut inner groove and the at least one recess.

15. The bearing subassembly as in claim 13, wherein the at least one recess comprises a plurality of generally bowl-shaped recesses.

16. The bearing subassembly as in claim 13, wherein the at least one recess comprises a continuous circumferential groove disposed about the bearing inner ring outer surface in communication with the groove of the adjusting nut.

* * * * *